United States Patent [19]

Tully

[11] 4,004,368

[45] Jan. 25, 1977

[54] AGRICULTURAL SOIL COMPOSITIONS

[75] Inventor: Paul Raymond Tully, Lowell, Mass.

[73] Assignee: Cabot Corporation, Boston, Mass.

[22] Filed: Jan. 15, 1976

[21] Appl. No.: 649,660

Related U.S. Application Data

[63] Continuation of Ser. No. 552,484, Feb. 24, 1975, abandoned.

[52] U.S. Cl. .............................. 47/58; 47/DIG. 10; 71/64 R
[51] Int. Cl.² ........................................... A01C 1/00
[58] Field of Search ........ 71/1, 64; 47/58, DIG. 10; 252/316

[56] References Cited

UNITED STATES PATENTS

| | | | |
|---|---|---|---|
| 3,710,510 | 1/1973 | Tully et al. | 47/58 |
| 3,713,253 | 1/1973 | Urban | 47/58 |

Primary Examiner—Robert E. Bagwill
Attorney, Agent, or Firm—Jack Schuman; Barry R. Blaker; Lawrence A. Chaletsky

[57] ABSTRACT

An agricultural soil composition for the growing of plants and the like is provided in which a means is included for controlling and regulating the distribution of water throughout the growing zone. This composition is characterized by including in the agricultural soil a critical proportion of hydrophobic particulate material.

12 Claims, No Drawings

AGRICULTURAL SOIL COMPOSITIONS

CROSS-REFERENCE

This application is a continuation of my copending application Ser. No. 552,484, filed Feb. 24, 1975 and now abandoned.

This invention relates to agricultural soil compositions formulated to control the delivery of the optimum amount of water to the root systems of growing plants. These compositions can be used in any agricultural application, whether in small containers as for house plants or in open fields.

As is well known to all gardeners and farmers, the essential condition for growth of any agricultural product is accessability to water in beneficial amounts. Too little water will result in stunted growth and even failure to grow at all and too much water will cause rotting and eventual destruction of the plant.

It is, therefore, the object of this invention to provide soil compositions adaptable to any environment whereby the water supply is regulated and controlled in accordance with the requirements of whatever is growing therein.

In my joint (with Robert J. Lippé) U.S. Pat. No. 3,710,510, assigned to Cabot Corporation, there are described plant growth media for germinating seeds and nurturing seedlings through the initial stages of their growth. My new invention is designed principally to provide for the next stages of plant growth which the compositions of said patent are incapable of doing, although, of course, seeds can also be germinated in the compositions of this invention.

The compositions of the present invention comprise the usual soil materials present in any garden to which has been added a hydrophobic solid particulate material in the proportion of one part by volume to about fifteen to forty parts by volume of the soil material. The criticality of these proportions will be explained and demonstrated hereinafter.

The hydrophobic particulate solids utilized in the compositions of this invention can be any of those which are described in detail in my said U.S. Pat. No. 3,710,510, which descriptions are incorporated by reference herein. Suffice it to say that the particulate material should be finely divided and hydrophobic to the extent that it will float on the surface of water. The preferred particulate is silica having a BET surface area of at least about 50 square meters per gram and having hydroxyl groups initially on the surface which have been substantially completely reacted with hydrophobizing agents such as organosilicon compounds. The surface treatment should be sufficient to attach organo groups totalling at least 0.5% and preferably at least 1% by dry weight of the particulate to the surface thereof.

The unexpected result achieved by incorporating the critical proportion of hydrophobic particulates in the soil for any given condition is the delivery of water throughout the body of soil and the maintenance of the water level therein at a preselected height regardless of the water level in the surrounding terrain. Once water is present in the body of the composition equilibrium will be maintained so long as water continues to be supplied from below. The reason for this is that the degree of capillary rise is controlled by the proportion of the hydrophobic particulate material in the composition which is selected so that inflow of fresh water will be no greater than the rate of evaporation from the surface of the total mass. Thus the improved soil composition never can become water saturated because the hydrophobic constituent of the soil, not being wettable, permits inflow of air along with water and maintains sufficient porosity in the body of the soil to prevent drowning of plants therein.

It is the constant and regulated delivery of water to the composition of my invention wherein lies the prinicipal distinction of this composition from that of my said U.S. Pat. No. 3,710,510. As noted in column 6 of the patent the strongly hydrophobic nature of the added particulate material which is present in amounts at least as great as one part by volume to eight, and preferably substantially fewer, i.e. three, parts by volume of soil materials prevents aqueous liquid from being drawn up into the soil bed. While some water vapor may diffuse into the interstices of the bed I have found in practice that the amount of diffusion is so slight that total evaporation of the initial water content plus whatever vapor may become added ultimately occurs and rather soon. Since water depletion becomes complete while the seedling is still young it must be transplanted in a more salubrious environment such as that of this invention. Furthermore, the water content of the composition of the patent cannot be reconstituted since that composition will not accept fresh water because of its extreme hydrophobicity and must, therefore, be discarded after use.

When my new composition is expected to remain in a container for long periods of times, even years, it may be advantageous to secure the hydrophobic particulate material by means of an adhesive to some heavier component of the soil. Otherwise, the particulates, which are much lighter and less dense than the remainder of the soil, tend, with passage of time to entrain in the upward migration of water. To counteract this trend and maintain more even distribution throughout the growth medium the particulate material can easily be attached to a heavier component such as sand by a suitable adhesive which is indestructible in the growing environment. A preferred class of such adhesives is that consisting of completely polymeric fluids having low viscosity and capability of being catalyzed or heat converted to a solid. Typical of these are the epoxy and polyester resins and reactive silicone fluids.

The joining of the light to heavier material is easily achieved. The heavy material is first tumbled in a rotating drum while adhesive is added. When in the tacky state the light material is added so that it sticks to the surface of the substrate. Thereafter, the adhesive is set by conventional means. It is merely necessary that the light hydrophobic component lie on the surface of the substrate so that its surfaces are exposed to the atmosphere. Useful procedures for making this material are described in my joint (with Lippé & Fletcher) U.S. Pat. No. 3,562,153.

A major utility of the composition of this invention is as a potting soil, that is, as bedding for the starting, feeding and development of plants in pots. Such pots must have openings in the bottom and be set in a container of water. When the correct amount of hydrophobic particulate material is incorporated in the bedding for the selected plant growing therein precisely the right amount of water for good growth conditions will migrate upwardly at a consistent rate so long as the reservoir below is supplied with water. The inflow rate will be most advantageously regulated so that the top one inch or so of soil is dry from evaporation. Such practice reduces the chance of sustained fungus growth on the soil surface. And it is because of the hydrophobic ingredient in the mix that evaporation will occur at the surface at a rate greater than the water replenishment from below. Thus by proper compounding a balance can be struck whereby the dry level can be established at the most desirable distance from the top, or, to put it otherwise, to provide water where it is most needed, at the root network.

It will be evident that so long as the reservoir in which the plant pot is seated contains water the water supply to the pot in continuously regulated amount is assured. Thus constant attention need not be applied to watering except to keep the reservoir supplied which can be done automatically and easily. Surface watering of conventional soils can, of course, be done automatically but this requires a much more complicated system in a reserved area which is not usually available for ornamental plants in homes, offices, show rooms and the like.

It is evident that the composition of my invention has tremendous potential for general agricultural use. Water control is of paramount importance in raising food crops for the world. By selective compounding of the hydrophobic element into the farmland water can most efficiently be used. Rainfall will pass through the soil more readily because of the myriad of nonadsorptive passages provided. The water will collect on the layers below and reverse flow upward will occur although at a slower rate, when the supply from above is terminated. So long as water remains at lower levels it will be metered upward at the desired rate to meet the requirements of the growing things. And where the soil contains too much water as in swampy terrain the higher concentrations of hydrophobic particulates will be used to resist hydraulic pressures.

The following examples are illustrative of the compositions of my invention and of the results achieved by the use thereof.

EXAMPLE 1

A potting soil consisting of equal volumes of vermiculite, perlite, and peat moss was blended with different proportions of hydrophobic pyrogenic silica having a BET surface of about 250 sq. meters per gram and 0.5% by weight of — $Si(CH3)_3$ surface groups obtained from treatment with hexamethyldisilazane. The silica was each time blended into the dry potting soil by tumbling in a one gallon container for five minutes. The various blends were evaluated for their water uptake by placing six ounce paper cups with perforated bottoms containing same in a tray of water one inch in depth. To initiate capillary rise four ounces (113.4 gm.) of water were poured into the top of each cup to saturate the mixture. The following gains in weight from water pick-up over the periods of days indicated were recorded.

| Volume ratio Soil/Silica | Dry wt. in cup (g) | Increase in wt. after 11 days (g) | Increase in g $H_2O$/g blend after 11 days | Increase in wt. after 15 days (g) | Increase in g $H_2O$/g blend after 15 days |
|---|---|---|---|---|---|
| Control (no silica) | 30 | 79 | 2.62 | 95 | 3.17 |
|  | 31 | 95 | 3.08 | 99 | 3.19 |
| 10/1 | 33 | 26 | 0.79 | 20 | 0.61 |
| 10/1 | 39 | 23 | 0.59 | 24 | 0.61 |
| 15/1 | 32 | 43 | 1.35 | 44 | 1.37 |
| 15/1 | 32 | 50 | 1.56 | 50 | 1.56 |
| 20/1 | 32 | 44 | 1.37 | 47 | 1.47 |
| 25/1 | 36 | 66 | 1.83 | 68 | 1.89 |
| 25/1 | 34 | 59 | 1.73 | 66 | 1.94 |
| 40/1 | 33 | 56 | 1.69 | 63 | 1.91 |
| 40/1 | 34 | 59 | 1.73 | 64 | 1.88 |

It will be evident from the foregoing data that too high a concentration of the hydrophobic constituent greatly inhibits the access of water to the soil (10/1 mix) whereas the soil with no hydrophobic content (control) absorbs much greater quantities of water. As between the 15/1 and 40/1 mixes the difference in quantity of water pick-up is not particularly great but shows the trend.

EXAMPLE 2

To demonstrate the effect of the hydrophobic silica content of the potting soil on controlling the moisture level in the pot, clear plastic cylinders 4 inches in diameter and 14 inches long were filled with the soil to within 2 inches of the top. The bottom closures were pierced with 10 quarter inch holes and the cylinders placed upright in a tray containing water maintained at a constant level of one-half inch. Water was initially poured into the top of each cylinder to accelerate commencement of capillary uptake. The following data were obtained.

|  | Depth of dry soil from Top (inches) | | |
|---|---|---|---|
|  | After 10 days | After 20 days | After 60 days |
| Control (no silica) | 0 | 0 | 0 |
| 20/1 Soil/silica | 0.5 | 1.0 | 1.0 |
| 40/1 Soil/silica | 0.75 | 0.5 | 0.5 |

Similar results were achieved using other soil blends with the same proportions of hydrophobic silica.

This example demonstrates the utility of hydrophobic silica as a control means for maintaining a constant and regulated supply of water to the growing bed. In each case the base potting soil was the same as that in Example 1 although it will be obvious that any soil suitable for plant growth can be used in the practice of this invention.

EXAMPLE 3

To demonstrate the effectiveness of the composition of this invention both for seed germination and growth of the resulting plant green beans and tomato seeds were planted in blends containing the indicated ratios of hydrophobic silica to commercial topsoil sold under the tradename "Ferlite". The results were as follows:

| Volume Ratio Soil/Silica | Green Beans | | Tomatoes | |
|---|---|---|---|---|
| | % Germination-at 30 days | Av. Ht. Ins. at 30 days | % Germination-at 30 days | Av. Ht. Ins. at 30 days |
| 10/1 | 0 | 0 | 0 | 0 |
| 15/1 | 80 | 12 | 0 | 0 |
| 20/1 | 90 | 16 | 20 | 7 |
| 30/1 | 80 | 14 | 40 | 10 |
| 40/1 | 0 | 0 | 70 | 14 |
| 50/1 | 0 | 0 | 85 | 13 |
| Control (no silica) | 0 | 0 | 90 | 8 |

It is, of course, well-known to those skilled in the art of farming that water requirements are not the same for all crops. But in the light of my invention selection of the optimum proportion of silica to soil can readily be determined. However, as shown by this example ratios of soil to silica less than about 15/1 are not satisfactory and anything above 40/1 is at best marginal.

So far as the control is concerned it is clear that the soil is saturated with water which is good for germination of tomato seeds but not for continued growth of the plant. And it is also well-known that if usual soils are watered only from the bottom and hence are kept saturated any plant therein will ultimately die. This is why watering must always be done from the top for such plantings and not too frequently so that the soil, after saturation from watering, has time to dry out. In contrast to the constant cycling between wet and dry in conventional practice the composition of my invention makes possible a closely controlled and consistent supply of just the right amount of water for the particular planting.

I claim:

1. An agricultural soil composition comprising a mixture of (a) one part by volumme of hydrophobic finely-divided particulate metallic oxide having a BET-$N_2$ surface area of at least about 50 $m^2/g$ and (b) between 15 and about 40 parts by volume of conventional soil material.

2. The composition of claim 1 wherein said hydrophobic particulate metallic oxide of (a) is secured to the surface of one or more components of the material of (b).

3. The composition of claim 2 wherein said hydrophobic particulate metallic oxide is secured by means of an adhesive chosen from the group of polymeric adhesives consisting of epoxy, polyester and reactive silicone fluid adhesives.

4. The composition of claim 1 wherein the hydrophobic particulate metallic oxide is silica having at least about 0.5 percent by weight of organo groups on the surface thereof.

5. The composition of claim 1 wherein said conventional soil material of (b) is chosen from the group consisting of: endemic topsoil, vermiculite, perlite, peatmoss, sand and mixtures thereof.

6. A potted plant soil system comprising: a containerized bed of soil comprising a mixture of (a) one part by volume of hydrophobic finely-divided particulate metallic oxide having a BET-$N_2$ surface area of at least about 50 $m^2/g$ and (b) between 15 and 40 parts by volume of conventional soil material chosen from the group consisting of endemic topsoil, vermiculite, perlite, peatmoss, sand and mixtures thereof; and means to deliver water to the bottom of said bed.

7. The system of claim 6 wherein said hydrophobic particulate metallic oxide of (a) is secured to the surface of one or more components of the material of (b).

8. The system of claim 7 wherein said hydrophobic particulate metallic oxide is secured by means of a polymeric adhesive chosen from the group consisting of epoxy, polyester and reactive silicone fluid adhesives.

9. The system of claim 6 wherein said hydrophobic particulate metallic oxide is silica having at least about 0.5 percent by weight of organo groups on the surface thereof.

10. An agricultural soil composition comprising a mixture of (a) one part by volume of hydrophobic finely-divided particulate metallic oxide having a BET-$N_2$ surface area of at least about 50 $m^2/g$ and (b) between 15 and 40 parts by volume of conventional soil material selected from the group consisting of endemic top soil, vermiculite, perlite, peatmoss, sand and mixtures thereof.

11. A method for growing plants which comprises immersing the roots thereof in a composition comprising a mixture of (a) one part by volume of hydrophobic finely-divided particulate metallic oxide having a BET-$N_2$ surface area of at least about 50 $m^2/g$ and (b) between 15 and about 40 parts by volume of conventional soil material, and delivering a growth-supporting quantity of water to said composition.

12. A method for growing plants from seed which comprises placing seeds into contact with a composition comprising a mixture of (a) one part by volume of hydrophobic finely-divided particulate metallic oxide having a BET-$N_2$ surface area of at least about 50 $m^2/g$ and (b) between 15 and about 40 parts by volume of one or more conventional soil materials, and delivering a seed germinating and growth-supporting quantity of water to said bed composition.

* * * * *